United States Patent Office 3,716,767
Patented Feb. 13, 1973

3,716,767
CONTROL DEVICE FOR ELECTRIC AUTOMOBILES INCLUDING ACCELERATOR POSITION AND CURRENT FEEDBACK
Sigeru Kuriyama and Seiki Kikuchi, Katsuta, Japan, assignors to Hitachi, Ltd., Tokyo, Japan
Filed Dec. 14, 1971, Ser. No. 207,781
Claims priority, application Japan, Dec. 26, 1970, 45/118,562
Int. Cl. H01p 7/00
U.S. Cl. 318—139
4 Claims

ABSTRACT OF THE DISCLOSURE

For the purpose of controlling a wheel driving motor with the aid of a thyristor chopper, there is provided a multivibrator adapted to produce an "ON" gate pulse for rendering the chopper operative and an "OFF" gate pulse for rendering the chopper inoperative, and the cyclic period of oscillation of the multivibrator is controlled by means of an accelerator pedal. When the accelerator pedal is at its full open position and the speed is above a predetermined level, the multivibrator is locked not to provide "OFF" gate pulse. Output current of the thyristor chopper circuit is detected by a current detecting circuit. Provision is made for means for imparting preference command to the multivibrator to enable the latter to produce "OFF" gate pulse when the magnitude of the detected current reaches a predetermined level. The command circuit is designed so that the generation of "ON" gate pulse is temporarily locked after an "OFF" gate pulse has been generated, thus securing the stability of control.

BACKGROUND OF THE INVENTION

Field of the invention

This invention relates to a control device for electric automobiles, and more particularly it pertains to a thyristor chopper control device for controlling a motor for driving wheels.

Description of the prior art

Environmental pollution by the exhaust gas of gasoline engines has become a problem, and various attempts have been and are being made to employ electric motors instead of gasoline engines as pollution-free driving sources. As power sources, batteries have commonly been used, and DC motors have frequently been used as driving motors by virtue of their performance and controllability. Various methods have heretofore been proposed to control DC motors, and chopper control by electronic switches has been considered the most promising and is the most frequently employed for automobiles from the standpoint of maintenance and controllability. A chopper is adapted to smoothly control an average voltage imparted to the electric motor over a wide range by changing the conduction rate in accordance with the command from a commanding means (normally an accelerator pedal in the case of automobiles). With such electrical choppers, however, various safety mechanisms are required due to the fact that various problems tend to arise in respect to current capacity or operation since they use semiconductor elements. Since the cost of such electrical choppers is high as compared with that of mechanical controllers, it is desired that the safety mechanisms can be manufactured at low costs.

On the other hand, loads imposed upon the motor are so dynamic as to continually change due to acceleration or deceleration and road surface conditions. Thus, it is desirable that the safety mechanisms which operate under such conditions work without adversely influencing the running performance.

SUMMARY OF THE INVENTION

It is an object of this invention to provide a control device for electric automobiles, which is so designed as to achieve stabilized drive control over a wide range.

Another object of this invention is to provide a control device for electric automobiles, which is so designed as to achieve stabilized drive control over a wide range, protecting electronic choppers for controlling the motor from overload current.

A further object of this invention is to provide a control device which is designed not to disturb the stability of drive control when protecting the electronic choppers from overload current.

A still further object of this invention is to construct the protective mechanism as inexpensively as possible.

Other objects, features and advantages of this invention will become apparent from the following detailed description taken in conjunction with the accompanying drawings.

The device according to this invention is characterized by the inclusion of a pulse generating circuit adapted to generate a gate pulse to control the electronic chopper in accordance with a command when the load current is within an allowable range, a current limiting circuit adapted for detecting the load current and acting on said pulse generating circuit to turn off the electronic chopper when the detected load current reaches an allowable limit level, and a circuit adapted to prevent the "OFF" control of the electronic chopper in accordance with a command when the speed of rotation of the electric motor is higher than a predetermined speed, only where the current limiting circuit is not operating.

DESCRIPTION OF THE PREFERRED EMBODIMENTS

Figure 1:
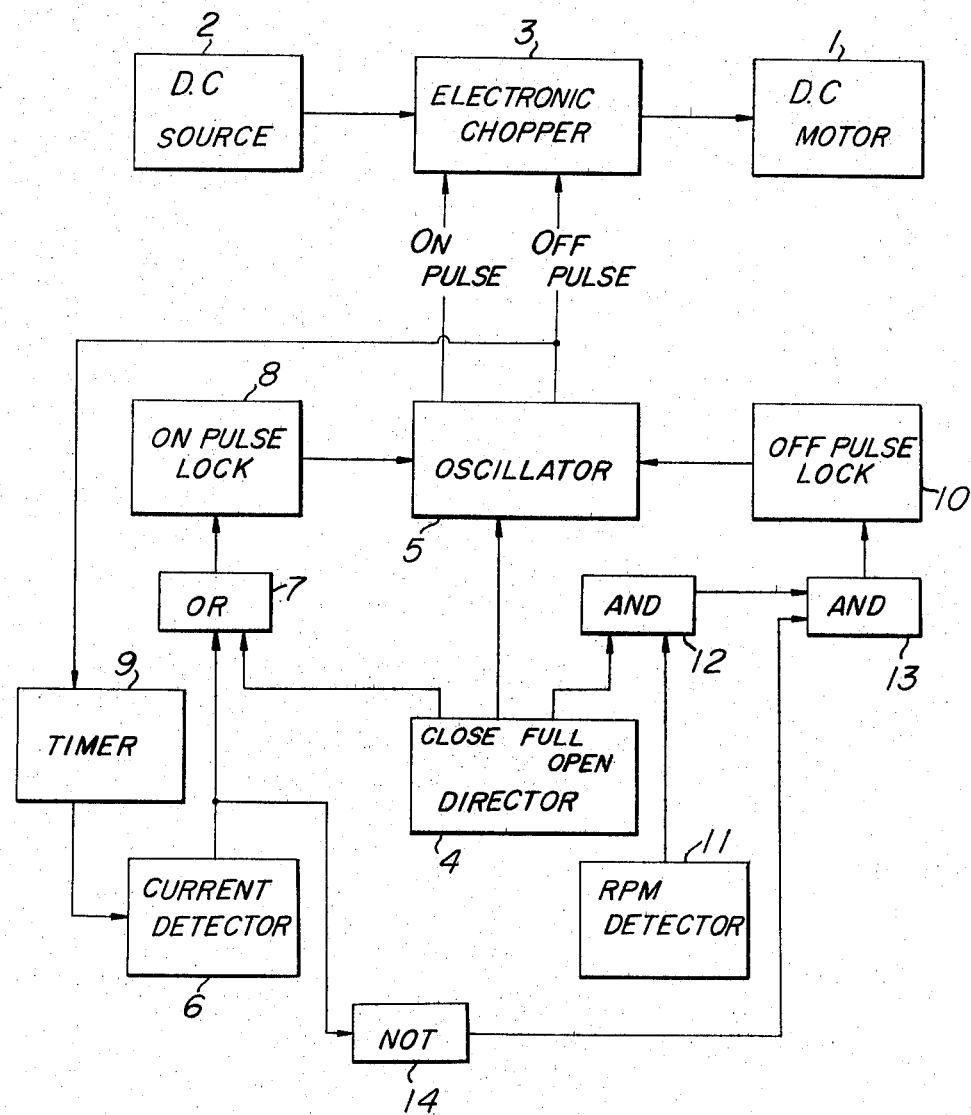
FIG. 1 is a block diagram showing an embodiment of this invention.

With reference to the block diagram shown in FIG. 1, description will be made of an embodiment of this invention, wherein reference a DC electric motor to which electric power is supplied from a DC power source 2 through an electronic chopper circuit 3. As the electronic chopper circuit 3, an ordinary thyristor chopper is advantageously employed in respect of current capacity, but it is also possible that a transistor chopper may be used. The electronic chopper circuit 3 is adapted to be on-off controlled by means of an oscillator circuit 5 which is so designed as to oscillate based on a command from commanding means 4. In the case where the commanding means 4 is an accelerator pedal, the oscillator circuit 5 changes the "ON" and "OFF" periods to change the conduction rate

ON
ON & OFF of the chopper 3, according to the extent that the pedal is stepped down, thus controlling the DC electric motor 1. The oscillator circuit 5 is constituted by an astable multivibrator, which is so designed as to alternately generate "ON" pulse and "OFF" pulse. Numeral 6 indicates a current detector adapted to detect the load current flowing through the electronic chopper 3. When the detected current reaches the allowable level (mainly, the allowable current capacity of the electronic chopper 3), the current detector 6 acts on an "ON" pulse lock circuit 8 through an OR gate circuit 7 and on the oscillator 5 to prevent the generation of the "ON" pulse and forcibly cause an "OFF" pulse to be generated by which the electronic chopper 3 is rendered inoperative. After the electronic chopper 3 has been turned off by the "OFF" pulse, the load current flowing through the electronic chopper 3 becomes null, but if the current detector 6 is immediately returned to the original state, the "ON" pulse lock is released; in order to avoid this, the design is made such that the output of the current detector 6 is temporarily held by means of a timer 9 after the "OFF" pulse has been generated by the oscillator circuit 5. Numeral 10 represents an "OFF" pulse lock circuit for preventing the oscillator circuit 5 from generating an "OFF" pulse and which is so designed as to act on the oscillator circuit 5 on the conditions that the rotating speed of the DC electric motor 1 is higher than the predetermined speed, the accelerator pedal is fully stepped down and the load current is within the allowable range. More specifically, the speed of rotation (output voltage of the electronic chopper) is detected by means of a rotating speed detector 11, a full open signal available from the commanding means 4 is introduced to an AND gate 13 through an AND gate 12, and then this signal is subjected to "AND" together with the output of the current detector 6 which is available through a NOT circuit 14, whereby the "OFF" pulse lock circuit 10 is operated.

With the foregoing system, under the condition that the accelerator pedal is not manipulated, a close signal is provided by the commanding means 4, which signal is supplied to operate the "ON" pulse lock circuit 8 through the OR gate 7, thereby preventing the oscillator 5 from generating "ON" pulse. Under such a condition, the electronc chopper 3 is in the "OFF" state so that no current is permitted to flow through the DC electric motor 1.

Thereafter, when the accelerator pedal is stepped down to the intermediate position, the close signal from the commanding means 6 disappears so that the "ON" pulse lock circuit 8 is rendered inoperative. As a result, the oscillator circuit 5 is brought into the oscillating condition, so that "ON" pulses and "OFF" pulses are alternately imparted to the electronic chopper. Thus, the electronic chopper repeats "ON" and "OFF" operations so as to control the average value of the magnitude of the voltage applied to the DC motor 1.

As the load on the DC motor 1 increases from the aforementioned normal condition, the current flowing through the electronic chopper 3 is increased, the value of which is detected by the current detector 6. When the load current increases up to a predetermined level which is set up in accordance with the allowable value for the electronic chopper 3 or the like, the current detector 6 provides an output by which the "ON" pulse lock circuit 8 is rendered operative through the OR gate 7. At this time, the oscillator circuit 5 is enabled to generate "OFF" pulses and is prevented from generating "ON" pulse. Such a locked condition is maintained for a predetermined period of time by the timer 9 so that the operation is stabilized. The timer 9 is provided for the purpose of preventing the operation from being disordered, because in the absence of such a timer the load current would immediately go below the predetermined level when the electronic chopper 3 is turned off by the "OFF" pulse so that the oscillator circuit 5 would be enabled to generate "ON" pulse.

Description will now be made of the behavior which occur when the load current is lower than the predetermined level and the accelerator pedal has been fully depressed. In this case, one input is imparted to the AND gate 13 through the NOT circuit 14. Then the commanding means 4 provides a full open signal which, if the r.p.m. of the electric motor 1 is higher than a predetermined value, is supplied to satisfy the AND gate 12 togeter with the output of the rotation detector 11, so that a signal is imparted to the other input of the AND gate 13, which is also thus satisfied so that a signal is imparted to the "OFF" pulse lock circuit 10, thereby preventing the oscillator circuit 5 from generating an "OFF" pulse. Thus, the electronic chopper 3 is prevented from being turned off so that the voltage of the DC power source 2 continues to be applied to the DC electric motor 1 so as to enable the latter to rotate at its full speed. In this case, the AND gate 12 serves to prevent acceleration shock which tends to occur if the overall voltage is applied while the DC electric motor 1 is rotating at a relatively low speed. Incidentally, it is also possible that the rotating speed of the DC electric motor 1 may be indirectly detected by detecting the average value of the output voltage available from the electronic chopper 3.

Even under such a full voltage condition, however, the detection of the load current continues to be performed so that when the value of the detected load current reaches the one set up in the current detector 6 the latter provides an output by which the output of the NOT circuit 14 is extinguished so that the AND gate 13 is opened. As a result, the "OFF" pulse lock circuit 10 is rendered inoperative. At the same time, the output of the current detector 6 is imparted to the "ON" pulse lock circuit 8 through the OR circuit 7 whereby the oscillator circuit 5 is made to generate an "OFF" pulse and is prevented from generating "ON" pulses. The design is made such that this condition persists for a period of time set by the timer 9, thus preventing the operation from being disordered. In this case, however, if the full open signal continues to be available from the commanding means 6, the "ON" pulse is again generated while the "OFF" pulse is prevented from being generated after the signal imparted to the timer 9 has become null. If thereafter the load current reaches the predetermined level, again the electronic chopper 3 will be turned off in the manner as described above. Thus, in this region, the electronic chopper 3 performs a chopper operation in which the "OFF" period is determined by the timer 9.

Figure 2:
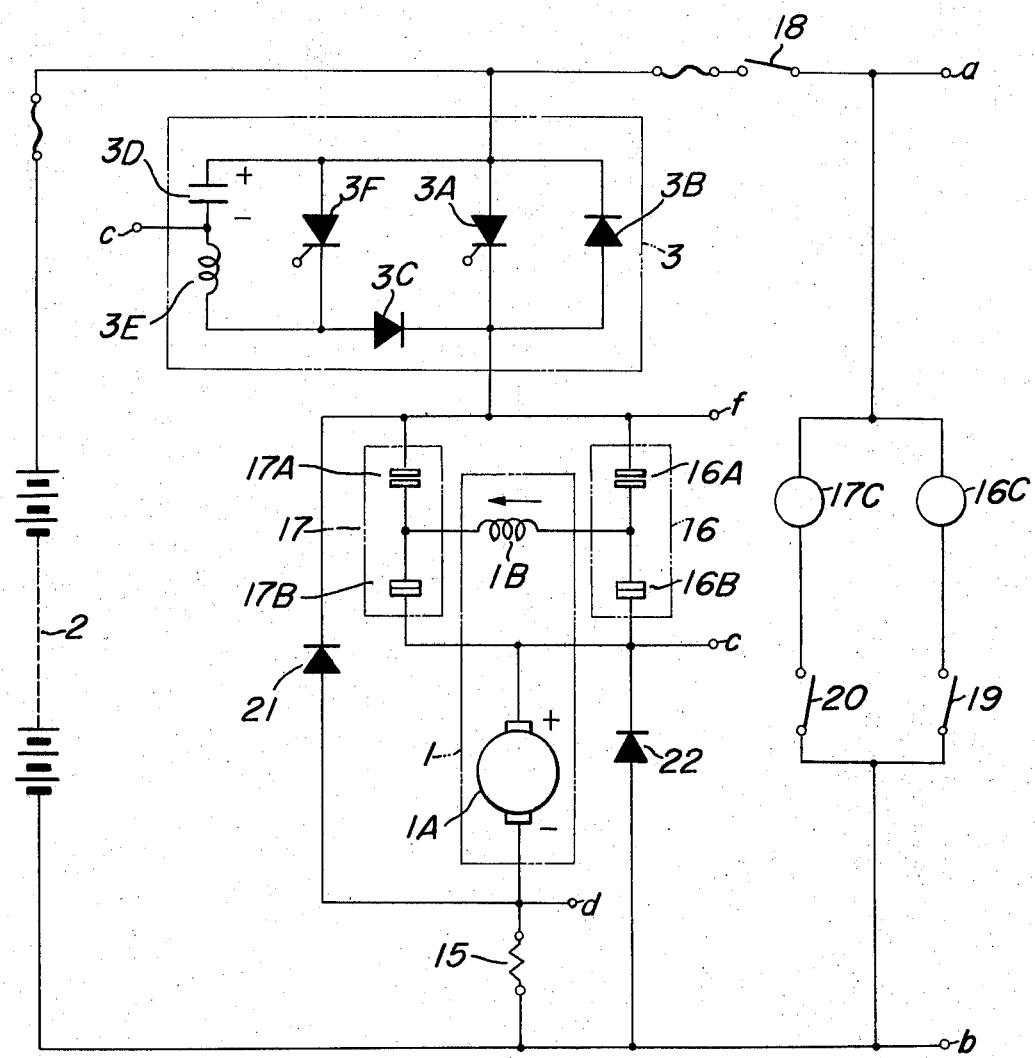
FIG. 2 is an electrical connection diagram of the main circuit.

Referring now to FIG. 2, description will be made of the main circuit for the DC electric motor 1 which is such a DC electric motor as described hereinbefore which comprises an armature 1A and series field coil 1B. The series field coil 1B has the outer end thereof connected with the positive terminal of a battery 2 thyristor chopper circuit 3, and the armature 1A has the outer end thereof connected with the negative terminal of the battery 2 through a current detecting resistor 15. Numerals 16 and 17 represent switches adapted to connect the field coil 1B in reverse polarity between the thyristor chopper circuit 3 and the armature 1A, respectively. The switch 16 for forward rotation has a normally open contact 16A and normally closed contact 16B which are connected in series between the thyristor chopper circuit 3 and the armatutre 1A, and the switch 17 for backward rotation has a normally open contact 17A and normally closed contact 17B which are connected in series between the thyristor chopper circuit 3 and the armature 1A. The series field coil 1B is connected between the inner contacts of the switches 16 and 17. Furthermore, these switches 16 and 17 are of the magnetically operable type. One end of an electromagnetic coil 16C for operating the contacts 16A and 16B of the forward rotation switch 16 and one end of an electromagnetic coil 17C for operating the contacts 17A and 17B of the backward rotatiton switch 17 are connected with each other and coupled to the positive terminal of the battery 2 through a key switch 18. The other ends of these coils are connected with the negative terminal of the battery 2 through operating switches 19 and 20. Numeral 21 indicates a flywheel diode connected in parallel with the DC electric motor 1 including the forward and backward rotation switches 16 and 17, and numeral 22 denotes a plugging diode connected in parallel with the armature 1A including the current detecting resistor 15. The thyristor circuit 3 consists of a main thyristor 3A, a by-pass diode 3B connected in reverse parallel with the main thyristor, a series circuit of a condenser 3D and reactor 3E which are connected in parallel with each other through a diode 3C, and an auxiliary thyristor 3F connected in parallel with the series circuit.

When it is desired to drive the automobile forwards, the key switch 18 is closed, and then the operating switch 19 is closed to energize the electromagnetic coil 16C. As a result, the forward switch 16 is operated so that the normally open contact 16A is closed while the normally closed contact 16B is opened. Thus, current path extending from the normally open contact 16A toward the backward switch 17B is established for the field coil. In this case, the design is made so that the polarity of the field flux produced by the current flowing in such a direction as indicated by an arrow mark results in the armature 1A being rotated in the forward direction. Upon establishment of the aforementioned current path, the condenser 3D in the thyristor chopper circuit 3 is charged in the illustrated polarity by the battery 2 by way of the reactor 3E-diode 3C-normally open contact 16A-field coil 1B-normally closed contact 17B-armature 1A-current detecting resistor 15.

Subsequently, by igniting and rendering conductive the thyristor 3A of the thyristor chopper circuit 3, a current is permitted to flow from the battery 2 to the DC electric motor 1 so that a forward torque is produced by the armature. Thereafter, by igniting the auxiliary thyristor 3F, the charge at the condenser 3D is discharged to the reactor 3D through the auxiliary thyristor 3F, so as to be converted into an L-C resonant current by which the thyristor 3A as well as the auxiliary thyristor 3F is ignited so that the current flowing through the electric motor 1 from the battery 2 is interrupted. By alternately repeating the ignition of the main thyristor 3A and auxiliary thyristor 3F, the current flowing through the electric motor 1 is interrupted. Thus, the output of the electric motor 1 can be controlled by changing the on-off ratio (conduction rate).

When it is desired to drive the automobile backwards, the switch 16 is returned to the original position by opening the operating switch 19, and the operating switch 20 is closed to energize the electromagnetic coil 17C whereby the forward rotation switch 17 is operated so that the normally open contact 17A is closed while the normally closed contact 17B is opened. By rendering the thyristor chopper circuit 3 operative under such a condition, the current flowing through the electromagnetic coil 1B is reversed so that a backward torque is produced by the armature 1A, whereby the automobile is driven backwards.

The polarity of the voltage induced in the armature 1A during normal drive is as shown in the drawing, but in the case of plugging drive, the polarity of the field coil 1B is reversed with the direction of rotation of the armature 1A left as it is, so that the polarity of the voltage induced in the armature is also reversed. Thus, the polarity of this induced voltage becomes forward with respect to a plugging diode 22 so that a circulation current flows through the current detecting resistor 15 and plugging diode 22, thus producing a braking torque.

Figure 3:
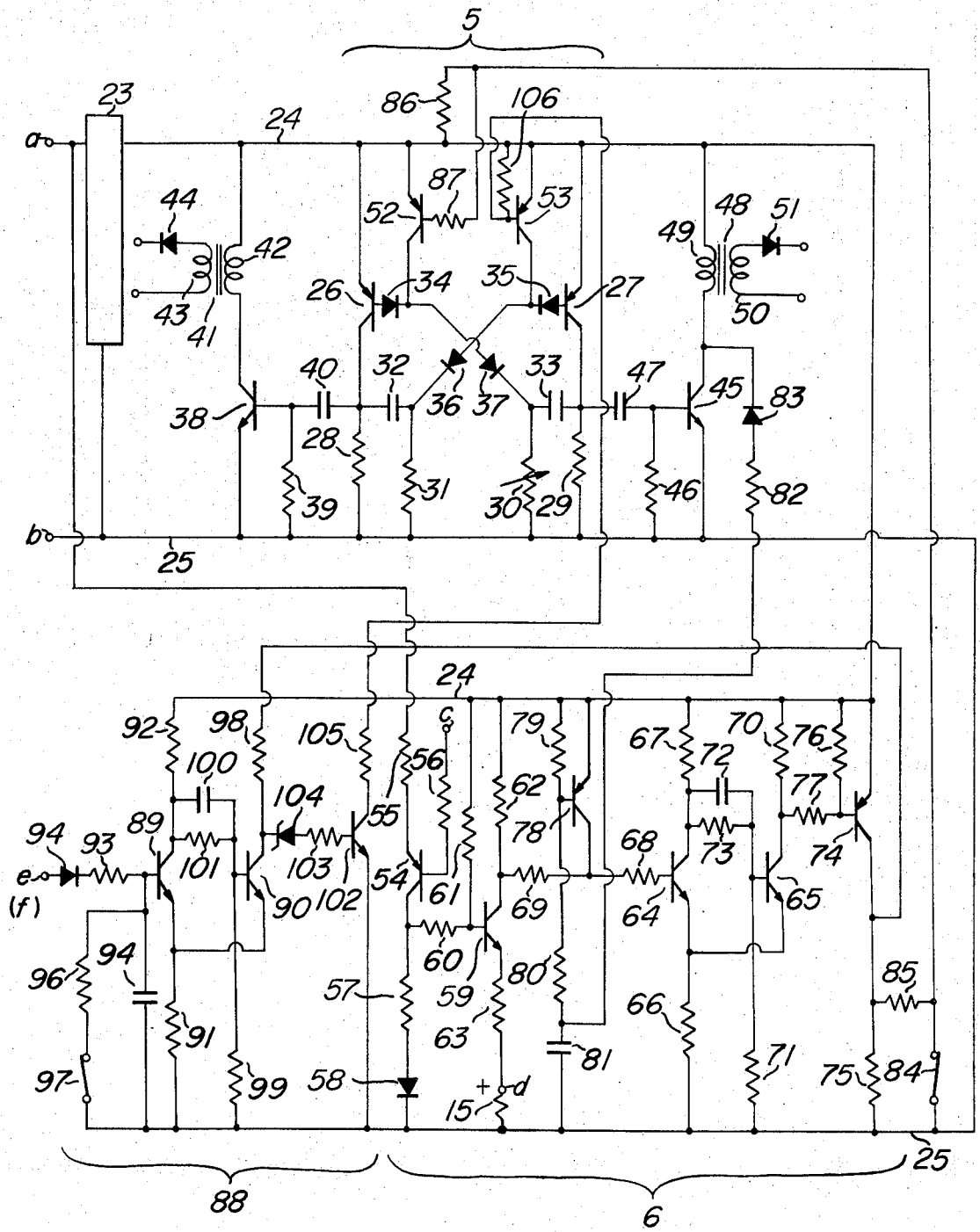
FIG. 3 is an electrical connection diagram of the auxiliary circuit.

Description will next be made of an auxiliary circuit for igniting the main thyristor 3A and auxiliary thyristor 3F of the thyristor chopper circuit 3, with reference to FIG. 3. An astable multivibrator 5 is established between conductors 24 and 25 taken out from terminals $a$ and $b$ of the circuit shown in FIG. 2 through a voltage stabilizing circuit 23. The astable multivibrator 5 consists of first and second PNP type transistors 26 and 27 having the emitters connected with a conductor 24, collector resistors 28, 29 and base resistors 30, 31 for connecting the collectors and bases of these transistors to a conductor 25, and condensers 32, 33 coupling the collector of one of the transistors to the base of the other transistor. Numerals 34, 35, 26 and 27 represent matching diodes. The base resistor 30 is of a variable type the resistance of which is varied in accordance with the extent that the accelerator pedal is stepped down. Numeral 38 indicates an NPN transistor having the emitter thereof connected with the conductor 25, the base thereof connected with the collector of the first transistor 26 through a differentiating circuit constituted by a resistor 39 and condenser 40, and the collector thereof connected with the conductor 24 through the primary coil 42 of a pulse transformer 41. The secondary coil 43 of the pulse transformer 41 is connected between the gate and the cathode of the main thyristor 3A of the thyristor chopper circuit 3 through a diode 44, so that the main thyristor 3A is ignited by a voltage ("ON" pulse) which is induced in the secondary coil 43 when the transistor 38 is rendered conductive. Numeral 45 represents an NPN transistor having the emitter thereof coupled to the conductor 25, the base thereof connected to the collector of the second transistor 27 through a differentiating circuit consisting of a resistor 46 and condenser 27, and the collector thereof connected with the conductor 24 through the primary coil 49 of a pulse transistor 48. The secondary coil 50 of the pulse transformer 48 is connected between the gate and the cathode of the auxiliary thyristor 3F of the thyristor chopper circuit 3 through a diode 51, so that the auxiliary thyristor 3F is ignited by a voltage ("OFF" pulse) which is induced in the secondary coil 50 when the transistor 45 is rendered conductive.

A PNP type transistor 52 has the emitter and collector thereof connected between the emitter of the first transistor 26 of the astable multivibrator 5 and the cathode of the diode 34. Thus, when the transistor 52 is rendered conductive, the transistor 26 is rendered non-conductive so that an "ON" pulse is prevented from being generated while an "OFF" pulse is generated. Furthermore, a PNP type transistor 53 has the emitter and collector thereof connected between the emitter of the second transistor 27 and the cathode of the diode 35. Thus, when the transistor 53 is rendered conductive the transistor 27 is rendered non-conductive so that an "OFF" pulse is prevented from being generated while an "ON" pulse is generated.

The load current detecting circuit 6 will be described below. A PNP type transistor 54 serves to detect energy stored in the condenser 3D of the thyristor chopper circuit 3. The emitter of the transistor 54 is connected with a terminal $a$ through a resistor 55, the base thereof is a terminal $c$ of the condenser 3D in the thyristor through a resistor 56, and the collector thereof is connected with the conductor 25 through a resistor 57 and diode 58. Hence, the potential at the collector of the transistor 54 is proportional to the energy (terminal voltage) stored in the condenser 3D. Numeral 59 represents an NPN type transistor having the base thereof connected with the collector of the transistor 54 through a resistor 60 and with the conductor 24 through a resistor 61, the collector thereof connected with the conductor 24 through a resistor 62, and the emitter thereof connected with the terminal $d$ of the current detecting resistor 15 through a resistor 63. The potential (corresponding to the load current) at the terminal $d$ acts to render the transistor 59 non-conductive since it is positive with respect to the terminal $d$, and the collector potential (corresponding to the energy stored in the condenser 3D) of the transistor 54 acts to render this transistor conductive. The collector potential of the transistor 59 is made to vary reversely proportional to the energy stored in the condenser 3D and proportional to the load current by setting up such a design that the transistor 59 is enabled to operate in the unsaturated region. Numerals 64 and 65 represent NPN type transistors constituting a Schmitt circuit wherein the emitters of the transistors 64 and 65 are connected with each other and also with the conductor 25 through a resistor 66. The collector of the fore-stage transistor 64 is connected with the conductor 24 through a resistor 67, and the base thereof is connected with the collector of the transistor 59 through resistors 68 and 69. The collector of the transistor 65 is connected with the conductor 24 through a resistor 70, and the base thereof is connected with the conductor 25 through a resistor 71 and with the collector of the transistor 64 through a parallel circuit of a condenser 72 and resistor 73. Numeral 74 indicates a polarity reversing PNP type transistor having the emitter thereof connected with the conductor 24. The collector of the transistor 74 is connected with the conductor 25 through a resistor 75, and the base thereof is connected with the conductor 24 through a resistor 76 and with the collector of the transistor 65 through a resistor 77. Numeral 78 represents a PNP type transistor for temporarily keeping the current detecting circuit 6 in operation immediately after "OFF" pulse has been imparted to the aforementioned thyristor chopper circuit 3. The emitter of the transistor 78 is connected directly with the conductor 24, the collector thereof is connected with a common terminal of resistors 68 and 69, and the base thereof is connected with a common terminal of voltage dividing resistors 79 and 80. The outer end of the voltage dividing a resistor 79 is connected with the conductor 24, and the outer end of the other resistor 80 is connected with the conductor 25 through a condenser 81. Common terminal of the resistor 80 and condenser 81 is connected with the collector of the transistor 45 through a resistor 82 and diode 83.

Numeral 84 represents a switch which is adapted to be closed when the accelerator pedal is stepped down. One contact of the switch 84 is connected with the conductor, and the other contact thereof is connected with the collector of the transistor 74 through a resistor 85 and connected between the base and the emitter of the transistor 52 through voltage dividing resistors 86 and 87.

A control circuit 88 is so designed as to detect the full open condition of the accelerator pedal and the rotating speed of the DC electric motor 1 and to prevent the generation of "OFF" pulse when the load current flowing through the thyristor chopper circuit 3 is within the allowable range. Numerals 89 and 90 indicate NPN transistors constituting a Schmitt circuit, the emitters of these transistors 89 and 90 being connected with each other and also with the conductor 25 through a resistor 91. The collector of the fore-stage transistor 89 is connected with the conductor 24 through a resistor 92, and the base thereof is connected with the armature terminal e of the DC electric motor 1 (or output terminal f of the thyristor chopper circuit 3) through a resistor 93 and diode 94. Furthermore, the base of the transistor 89 is connected with the conductor 25 through a condenser 95 and also through a series circuit of a resistor 96 and switch 97. The switch 97 is adapted to be opened when the accelerator pedal assumes the full open position. The collector of the post-stage transistor 90 is connected with the collector of the transistor 74 through a resistor 98, and the base thereof is connected with the conductor 24 through a resistor 99 and also with the collector of the transistor 89 through a parallel circuit of a condenser 100 and resistor 101. Numeral 102 represents a polarity reversing NPN type transistor having the emitter connected directly with the conductor 25. The base of the transistor 102 is connected with the collector of the transistor 90 through a resistor 103 and Zener diode 104, and the collector thereof is connected with the base of the transistor 53 through voltage dividing resistors 105 and 106.

With the foregoing arrangement, under the condition that the accelerator pedal is closed, the switch 84 is closed so that the transistor 52 is rendered conductive. At this point, the astable multivibrator is prevented from oscillation because the transistor 26 is in the non-conducting state and the transistor 27 is in the conducting state. Thus, the thyristor chopper circuit is in the non-conductive state.

In case the accelerator pedal is stepped down, the switch 84 is opened so that the transistor 54 is rendered non-conductive, with a result that the astable multivibrator 5 is brought into the oscillating state. When the transistor 26 is rendered conductive, the transistor 38 is rendered conductive so as to ignite the main thyristor 3A of the thyristor chopper circuit 3 through the pulse transformer 41. On the other hand, when the other transistor 27 is rendered conductive, the transistor 45 is rendered conductive to ignite the auxiliary thyristor 3F of the thyristor chopper circuit 3 through the pulse transformer 50. The interval between the ignitions of these thyristors 3A and 3F is achieved by changing the oscillation period of the astable multivibrator 5 by means of the variable resistor 30 which is variable depending on the extent that the accelerator pedal is stepped down.

Under a normal load current condition, the terminal voltage of the current detecting resistor 15 is such that the transistor 59 is sufficiently conductive and that the collector voltage thereof is low. Thus, the fore-stage transistor 64 of the Schmitt circuit is in the non-conducting state, and therefore the post-stage transistor 65 and transistor 74 are rendered conductive so that the collector potential of the transistor 74 is high, whereby the transistor 52 is rendered non-conductive. However, if the transistor 27 of the astable multivibrator 5 is rendered conductive so that the transistor 45 is rendered conductive so as to produce an "OFF" pulse, then the charge at the condenser 81 of the load current detecting circuit 6 will be discharged so that the transistor 78 will be rendered conductive so as to temporarily render the transistor 64 of the Schmitt circuit conductive. At that time, the transistor 52 is rendered conductive, but this has no effect on the transistor 26 because the latter is in the non-conducting state.

However, as the load current increases as a result of an increase of the load imposed on the motor, the voltage drop across the current detecting resistor 15 becomes greater so that the conduction of the transistor 59 is reduced with a result that the collector potential thereof builds up when this collector potential reaches a set level, the transistor 16 a rendered conductive while the transistors 65 and 74 are rendered non-conductive. As a result, the collector potential of the transistor 74 is decreased so that the transistor 52 is rendered conductive. At this point, the multivibrator 5 is in such a condition that the transistor 26 is rendered conductive to generate an "ON" pulse; therefore, when the transistor 52 is rendered conductive to short-circuit the base-emitter of the transistor 26 is rendered non-conductive to make conductive the transistor 27 which has been in the non-conducting state. Thus, the transistor 45 is rendered conductive so that "OFF" pulse is generated by the pulse transformer 48 whereby the auxiliary thyristor 3F of the thyristor chopper circuit 3 is ignited to interrupt the load current. By setting up the design such that the set voltage for the Schmitt circuit corresponds to the allowable current of the equipment, it is possible to protect the equipment from excess current. When the thyristor chopper circuit 3 is turned off, the current flowing through the thyristor chopper circuit 3 becomes null, so that the current detecting resistor 15 disappears. As a result, the collector potential of the transistor 59 drops, but the transistor 78 is rendered conductive by the fact that when the "OFF" pulse is generated the charge at the condenser 81 is discharged by the transistor 45 through the resistor 82 and diode 83. In this way, the conduction of the transistor 64 of the Schmitt circuit will be maintained until the transistor 78 is rendered conductive so that the condenser 81 is again discharged completely. This prevents any abnormal operation of the thyristor chopper circuit 3 which tends to be caused due to the operation of the load current detecting circuit 6.

Description will now be made of the behavior which occurs when the accelerator pedal has been fully stepped down to the full open position. First, when the accelerator pedal assemes the full open position; the switch 97 is opened so that the base circuit of the transistor 89 of the control circuit 88 is released. Then, the terminal voltage of the armature 1A of the DC electric motor 1 is imparted from the terminal e to the base of the transistor 89 through a diode 94 and resistor 93. In case the rotating speed of the armature 1A is higher than the predetermined one (if the output voltage of the thyristor chopper circuit 3 is higher than the predetermined level), then the transistor 89 will be rendered conductive. When the set voltage is reached, the transistor 89 is rendered conductive since it constitutes the Schmitt circuit together with the transistor 90. At this point, if the load current of the thyristor chopper circuit 3 is within the predetermined range, then the transistor 74 of the current detecting circuit 6 is in the conducting state so that a voltage is imparted to the collector of the transistor 90. Therefore, if the transistor 90 is rendered nonconductive, then the collector voltage thereof builds up to break down a Zener diode 104, thus rendering a transistor 102 conductive. In order for the transistor 53 connected with the multivibrator 5 to be rendered conductive, the transistor 27 is forced to be turned off so that an "ON" pulse in generated while an "OFF" pulse is prevented from being generated. Consequently, the thyristor chopper circuit 3 is turned on so that the voltage of the battery 2 is imparted to the DC electric motor 1 as it is.

Under such conditions, the load current which flows through the thyristor chopper circuit 3 depends on the load imposed on the electric motor 1. Upon arrival of the load current at the allowable level, the current detecting circuit 6 operates so as to turn off the transistor 74. This causes the collector voltage of the transistor 74 to be decreased so that the transistor 52 connected with the astable multivibrator 5 is rendered conductive. At the same time, the collector potential of the transistor 90 incorporated in the control circuit 88 is also decreased so that the transistor 102 is turned off, with a result that the transistor 53 connected with the astable multivibrator 5 is rendered non-conductive. Thus, the transistor 26 incorporated in the astable multivibrator 5 is maintained in the non-conducting state so that an "ON" pulse is prevented from being generated, while the transistor 27 is rendered conductive so that an "OFF" pulse is generated. At this point, too, the condenser 81 of the current detecting circuit 6 is discharged so that the transistor 78 is temporarily rendered conductive, thus, there is no possibility that an "ON" pulse is generated upon the turning-off of the thyristor chopper circuit 3 by an "OFF" pulse. Thereafter, the non-conducting state so that the transistor is again rendered conductive so as to turn off the transistor 52 and turn on the transistor 53, with a result that "ON" pulse is generated whereby the thyristor chopper circuit 3 is rendered conductive. In this way, the control circuit 88 can permit the thyristor chopper circuit 3 to effect 100% conduction (within the range of an allowable load) without difficulty, in accordance with the extent that the accelerator pedal is stepped down.

In the foregoing, description has been made of the case where the oscillator circuit was constituted by an astable multivibrator; however, this invention is not limited thereto. Furthermore, in the aforementioned embodiment, a Schmitt circuit was employed as detector circuit, but it is also possible that use may be made of a level detecting circuit. Still furthermore, it will be readily apparent that control for the oscillator circuit is not limited to an accelerator pedal.

We claim:

1. A control device for electric automobiles, comprising a series circuit of a DC electric motor for driving the wheels, DC power source and thyristor chopper circuit, an astable oscillator circuit including first and second transistors which are so combined as to represent opposite conductivity types, an "ON" pulse generating circuit for rendering said thyristor chopper circuit conductive on the basis of the conduction of said first transistor, an "OFF" pulse generating circuit for rendering said thyristor chopper circuit non-conductive on the basis of the conduction of said second transistor, operating means for controlling the oscillation period of said astable oscillator circuit, first means for forcibly preventing the generation of said "ON" pulse when said operating means is inoperative, second means for forcibly preventing the generation of said "OFF" pulse when the amount of manipulation of said operating means is maximum, and current limiting means for forcing said "OFF" pulse generating circuit to generate an "OFF" pulse by nullifying the operation of said second means when a predetermined value of the load current flowing through said thyristor chopper circuit is detected.

2. A control circuit for electric automobiles according to claim 1, wherein said current limiting means includes a timer for maintaining said current limiting means operative for a predetermined period of time after said "OFF" pulse has been produced.

3. A control device for electric automobiles according to claim 1, wherein said second means is adapted to forcibly prevent the generation of said "OFF" pulse when such conditions are satisfied that the amount of manipulation of said operating means is maximum, the terminal voltage of said DC electric motor is higher than a predetemined value and said current limiting circuit is inoperative.

4. A control device for electric automobiles, comprising a series circuit of a DC electric motor for driving the wheels, DC power source and thyristor chopper circuit, an astable multivibrator constituted by first and second transistors, an "ON" pulse generating circuit for turning on said thyristor chopper circuit in synchronism with the conduction of said first transistor, an "OFF" pulse generating circuit for turning off said thyristor chopper circuit in synchronism with the conduction of said second transistor, operating means for changing the time constant of the base circuit of at least one of said transistors of said astable multivibrator, first means for maintaining said first transistor of said astable multivibrator in the non-conducting state when said operating means is inoperative, second means for maintaining the second transistor of said astable multivibrator in the non-conducting state when the amount of manipulation of said operating means is maximum, and current control means for rendering said first means operative by nullifying the operation of said second means when a predetermined value of the load current flowing through said thyristor chopper circuit in detected.

References Cited
UNITED STATES PATENTS

| | | | |
|---|---|---|---|
| 3,569,810 | 3/1971 | Thiele | 318—341 |
| 3,437,826 | 8/1969 | Kelley | 318—341 X |
| 3,564,369 | 2/1971 | Huntzinger et al. | 318—341 |
| 3,349,309 | 10/1967 | Dunnettell | 318—139 |
| 3,546,548 | 12/1970 | Wouk | 318—139 |

GLEN B. SIMMONS, Primary Examiner

U.S. Cl. X.R.

318—341; 180—65